June 6, 1950
L. E. GRIFFITHS ET AL
2,510,694
ELECTRICAL CONDENSER
Filed Jan. 8, 1948
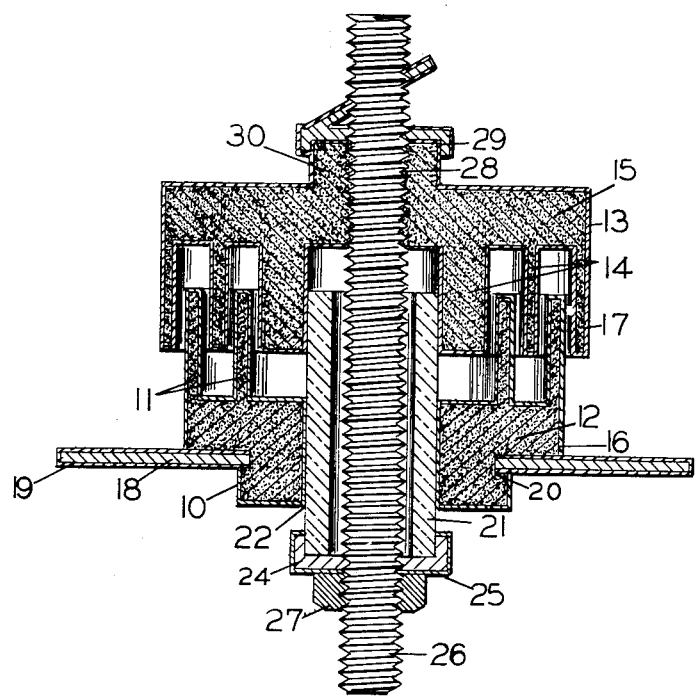
Inventors,
LEIGHTON E. GRIFFITHS.
JOHANNES N. HIENSCH.
BY
AGENT Patented June 6, 1950

2,510,694

UNITED STATES PATENT OFFICE 2,510,694

ELECTRICAL CONDENSER

Leighton E. Griffiths, Ossining, and Johannes N. Hiensch, Larchmont, N. Y., assignors to Philips Laboratories, Inc., Irvington on Hudson, N. Y.

Application January 8, 1948, Serial No. 1,192

4 Claims. (Cl. 175—41.5)

This invention relates to electrical condensers and particularly to adjustable capacity condensers comprising a plurality of interfitting tubular electrodes and will be described in connection with such adjustable condensers. Condensers comprising electrodes in the form of interfitting concentric metal cups secured to a common base are presently known in the art as will be seen by reference to U. S. Patent No. 2,161,419 issued June 6, 1939, which patent discloses a method of manufacturing the electrodes of the condenser from a single piece of material in a single operation by means of a "cold squirting process."

Condensers of this type have also been made by machining the electrode from a single block of metal or by die casting the metal in the form of an integral assembly.

Condensers made by "cold squirting" the metal thereof have been found to be of comparatively high cost. When it is attempted to make the concentric cup electrodes by machine forming a solid block of the metal, it is found that the concentric walls of the cups must be made comparatively thick in order to prevent tearing of the metal by the cutting tool and to prevent distortion of the cup-shaped electrodes due to the localized heating occurring during the cutting. While the die casting method is the cheapest method, in attempts to die cast the electrode, it has been found that the walls must be made of substantial thickness as otherwise they tear when the die is removed. These unsatisfactory conditions prevail particularly when small size condensers are to be made.

It is an object of the invention to provide a novel condenser which obviates the foregoing difficulties in the manufacture thereof.

Another object of the invention is to provide adjustable condensers comprising concentric interleaved cup-shaped electrodes characterized by a low cost and a high degree of uniformity.

A further object of the invention is to provide a novel adjustable condenser which is non-microphonic and which is highly stable when subjected to changes in temperature and humidity.

These and further objects of the invention will appear as the specification progresses.

According to the present invention, we provide an adjustable condenser having concentric interleaved cup-shaped electrodes constituted by a formed body of a pulverulent non-metallic electrically conducting material such as graphite and produce the said electrodes by machining a block of the said material to form concentric tubular portions integrally connected to a base portion. In the preferred arrangement of the invention, the walls of the concentric cups are provided with one or more metal platings whereby the strength of the walls thereof is increased manyfold and at the same time the electrode is made resistant to humidity changes and the effective electrical resistance thereof even at high frequencies is reduced to a small value.

Because of the pulverulent quality of the material of the body from which are formed the electrodes, the body may be readily machined without tearing or distortion thereof to produce electrodes having uniform wall thickness of the order of .008 inch. Furthermore, because of the inherent properties of the pulverulent material, the electrode is rigid and a condenser so formed is non-microphonic. A formed body of graphite has been found particularly suitable for the purposes of the invention. More particularly, a formed body of graphite not only exhibits a low temperature coefficient of expansion thereby bringing about a condenser of great temperature stability, but also the graphite serves as a lubricant for the machining tool whereby no significant heating of the tool and of the graphite occurs and distortions of the resultant electrode from this cause are prevented. Particularly suitable for the purposes of the invention are formed bodies of graphite having a hardness between about 40 and 50, a tensile strength of the order of 3500 to 6500 pounds per inch-squared, an apparent density between about 1.6 and 1.75 and a specific resistance of the order of .0003 to .0004.

The invention will be described in greater detail with reference to the appended drawing showing in a cross-sectional view a trimmer condenser in accordance with the invention.

Referring to the drawing, the condenser shown comprises a stator electrode 10 having two concentric cup-shaped portions 11 integrally connected to a common base portion 12 and a rotor electrode 13 comprising three concentric cup-shaped portions 14 integrally connected to a common base portion 15. The cup-shaped portions 11 and the cup-shaped portions 14 are so spaced so as to freely interfit without short-circuiting upon axial movement of the electrode 13 relative to the electrode 10. Each of the electrodes 10 and 13 is constituted by a pulverulent non-metallic electrically conducting material, preferably graphite, conforming to the above noted characteristics. In accordance with the preferred embodiment of the invention, each electrode is provided with a copper plating and a superimposed silver plating. The composite plating on electrode 10 is shown at 16 and the plating on electrode 13 is shown at 17. The copper plating is preferably from .0005 to .001 inch thick although it is obvious that thicker films may be applied particularly in those instances when a condenser having an extremely high current carrying capacity is desired or where greatly increased strength is required. However, the plating should not be too thick or otherwise the low temperature coefficient of capacity normally existing because of the low temperature coefficient of expansion of the underlying graphite is impaired. The superimposed silver plating is approximately .0001 inch thick and this thickness we have found is sufficient to ensure a permanently clean surface, prevent corrosion of the condenser and to provide a low resistance current conducting coating to which electrical connection to the electrodes may be made.

A metal lug 18 provided with a silver coating 19 is force fitted within a peripheral recess 20 of the said stator electrode 10. For coaxially aligning the electrodes 10 and 13, there is provided a tubular shaped ceramic member 21 which is press fitted into a central opening 22 of the stator electrode 10 and which forms a sliding fit within the cavity of the inner of the cup-shaped walls 14 of the rotor electrode 13. A flanged cap member 24 provided with an outer silver plating 25 is tight fitted to the lower end of the said ceramic sleeve 21. For moving the electrodes 10 and 13 relative to each other, there is provided a threaded spindle 26 which is attached at one end to the flanged cap 24 by means of a threaded nut 27 and engages corresponding threads in the aperture 28 of the rotor electrode 13. A lock nut 29 secured to an axially extending portion 30 of the rotor 13 secures the rotor against inadvertent rotation along the threaded spindle 26.

Well known procedures and plating solutions may be used for applying the copper and silver electroplatings 16 and 17 to the electrodes 10 and 13. However, we have found the following procedure and plating solutions to be particularly effective in view of the enhanced throwing power realized which provides uniform and continuous platings even within the deep recesses formed by the concentric cup-shaped walls of the electrodes.

For applying the copper plating, the electrodes 10 and 13 are first given a strike plating in an electroplating solution comprising 1 gallon of water, 2½ ounces of copper cyanide, 3½ ounces of sodium cyanide and 1 ounce of caustic soda. A satisfactory coating is formed at a current density of 25 amperes per square foot applied for about one minute. After thoroughly rinsing, the electrodes are given an intermediary acid dip, for example, in 1% sulphuric acid and thereafter the copper plating is applied. A suitable solution for the copper plating comprises per gallon of aqueous solution, copper sulphate ($CuSO_4.5H_2O$) 26.5 ounces, sodium pyrophosphate ($Na_4P_2O_7.10H_2O$) 26.5 ounces and sodium chloride ($NaCl$) 3.8 ounces. Potassium hydroxide is added to the solution to adjust its pH value to approximately 8.2. The solution is maintained at a temperature of approximately 130° F. and by applying a current density of approximately 20 amperes per square foot for approximately 30 minutes a copper plating of approximately .0005 inch thick is formed over the electrode surfaces. The subsequent silver plating of the so processed electrodes takes place in an aqueous solution consisting per gallon of solution of 3½ ounces of silver cyanide, 6 ounces of potassium cyanide, 6 ounces of potassium carbonate, and .02 ounce of carbon disulphide. The solution is maintained at a temperature of 90° F. and the electroplating takes place at a current density of 10 to 15 amperes per square foot for about 5 minutes. The electrodes are then thoroughly rinsed and after drying preferably in a hot air column, the electrodes are assembled to form the condenser shown.

One or more strike platings may be applied to the electrodes prior to the aforementioned silver plating to facilitate the deposition thereof. A suitable aqueous solution for this purpose may comprise per gallon, 10 ounces of sodium cyanide, 8 ounces of copper cyanide, ½ ounce of silver cyanide. At a plating temperature of 80° F. and a current density of 20 amperes per square foot a strike coating is formed in about one minute.

While we have described our invention by means of specific examples and in a specific embodiment, we do not wish to be limited thereto for obvious modifications will occur to those skilled in the art without departing from the spirit and scope of the invention.

What we claim is:

1. An electrical condenser comprising a first electrode having a base portion and a plurality of concentric tubular wall portions integrally extending from said base portion, and a second electrode having a base portion and a plurality of concentric tubular wall portions extending from said second base portion, said first and said second tubular wall portions being arranged in spaced interfitting relationship, said base portions and said wall portions being constituted of a formed body of a graphite, and low electrical resistance metal layers forming electroplatings on said base portions and said wall portions.

2. An electrical condenser comprising a first electrode having a base portion and a plurality of concentric tubular wall portions integrally extending from said base portion, a second electrode having a base portion and a plurality of concentric tubular wall portions extending from said second base portion, said base portions and said wall portions being constituted of a formed body of graphite, copper layers forming electroplatings on said base portions and said tubular wall portions, silver layers superimposed on said copper layers, and means securing said first and second electrodes in interfitting spaced relationship.

3. A condenser comprising a supporting base, a plurality of tubular cup-shaped graphite members of different diameters all having their bases in electrical connection and being provided with a metallic covering to exclude moisture absorption by the graphite, said cups being nested in one another to form a single first electrode structure, a series of similar cup-shaped tubular members of graphite having a common base connection and being plated to exclude moisture absorption by the graphite forming a second electrode structure, the tubular cup-shaped members of the second electrode having successive diameters at which the first and second electrodes are interleaved.

4. A condenser comprising an insulating supporting base, a plurality of tubular cup-shaped graphite members of different diameters having a common base providing an electrical connection between the several members, a composite metal layer over the graphite to exclude moisture absorption by the graphite, comprising a first layer of copper over the graphite and a second layer of silver over the copper, said cups being nested in one another to form a single first electrode structure, a series of similar cup-shaped tubular graphite members having a common base, which form a second electrode structure, a composite metal layer over the graphite of the second electrode comprising a first layer of copper over the graphite and a second layer of silver over the copper, the tubular cup-shaped members of the second electrode having successive diameters at which the first and second electrodes are interleaved.

LEIGHTON E. GRIFFITHS.
JOHANNES N. HIENSCH.

REFERENCES CITED

The following references are of record in the file of this patent:

UNITED STATES PATENTS

| Number | Name | Date |
|---|---|---|
| 1,150,895 | Sloan | Aug. 24, 1915 |
| 1,718,783 | Herman | June 25, 1929 |
| 2,031,846 | Muth | Feb. 25, 1936 |
| 2,165,738 | Van Hoffen | July 11, 1939 |
| 2,225,770 | Dorn | Dec. 24, 1940 |

FOREIGN PATENTS

| Number | Country | Date |
|---|---|---|
| 416,457 | Great Britain | Sept. 14, 1934 |
| 558,281 | Great Britain | Dec. 29, 1943 |

OTHER REFERENCES

"Carbon and Graphite Products," catalog section M-8000A, National Carbon Co., Inc.; pages 2 and 19.